Aug. 3, 1965    S. A. SPANGLER    3,197,940
APPARATUS FOR APPLYING COVERS TO CONTAINERS
Filed April 12, 1962    5 Sheets-Sheet 4
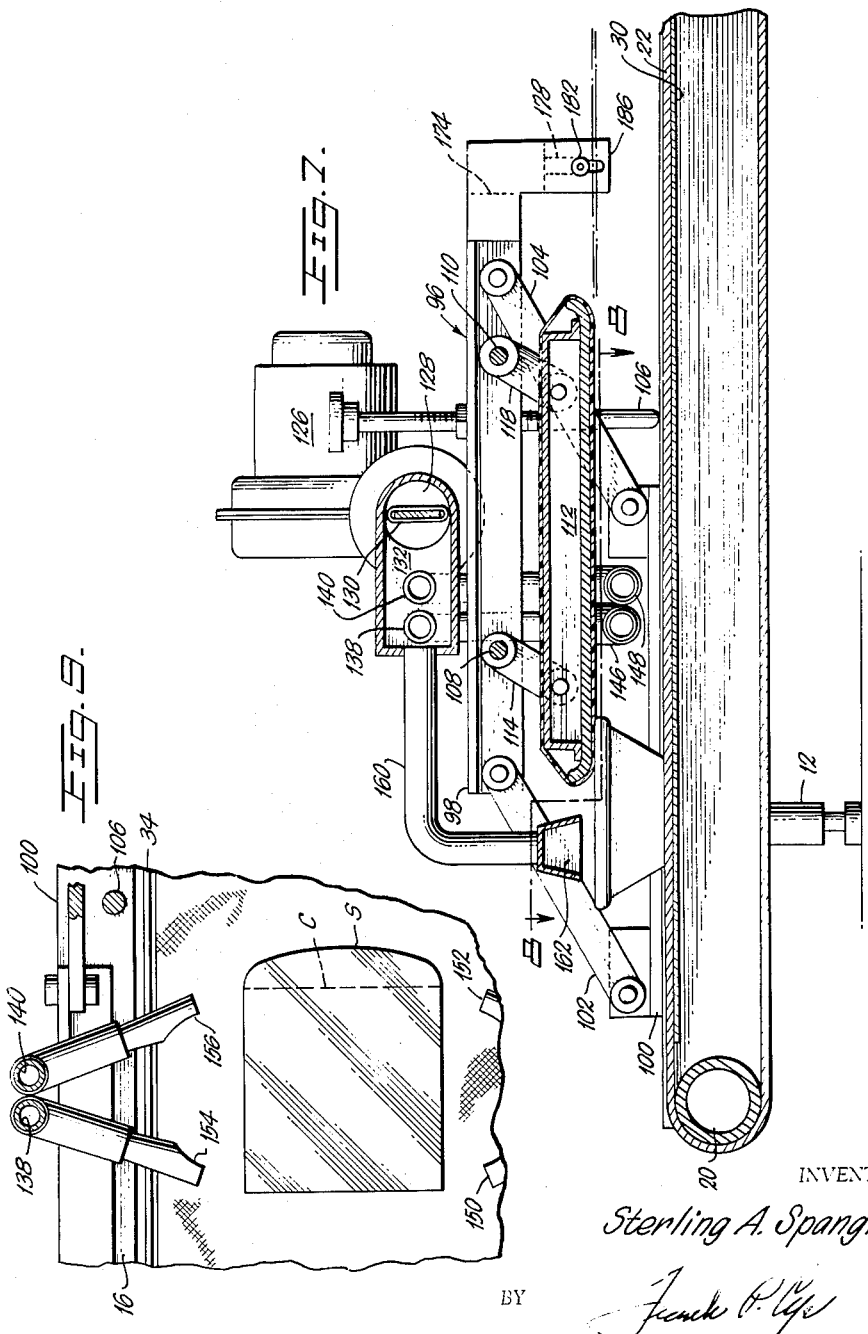
INVENTOR
Sterling A. Spangler
BY
ATTORNEY

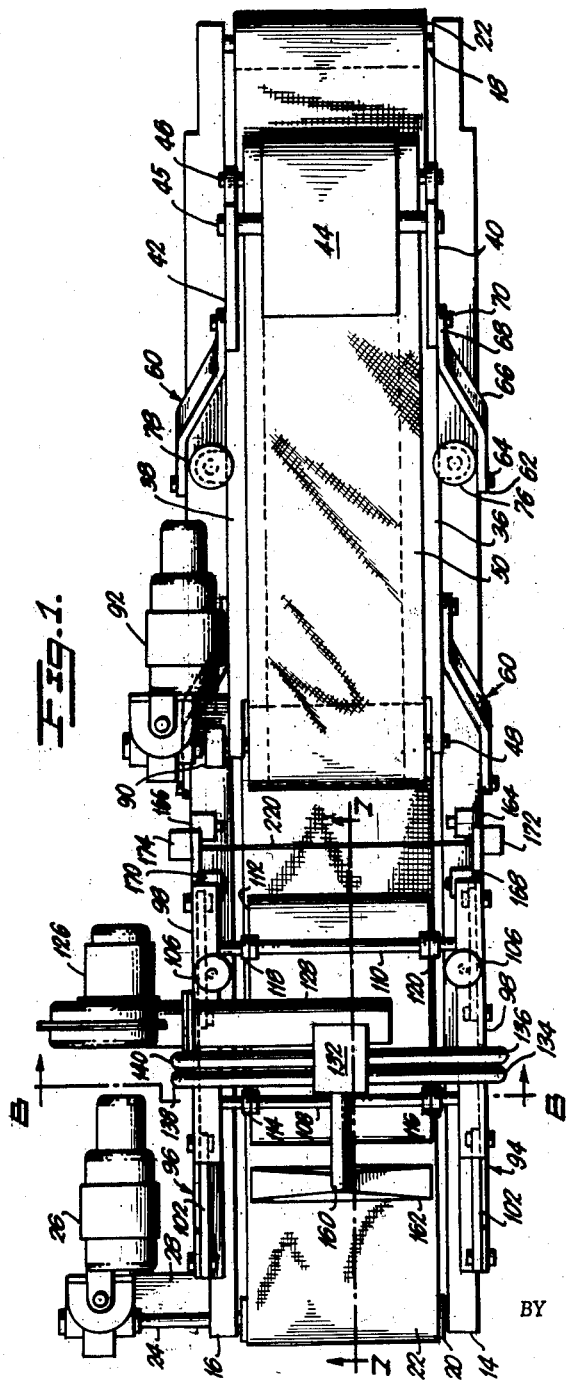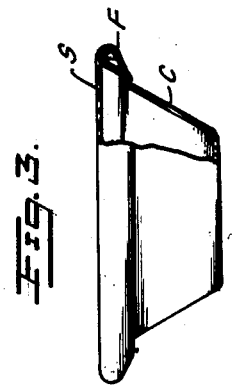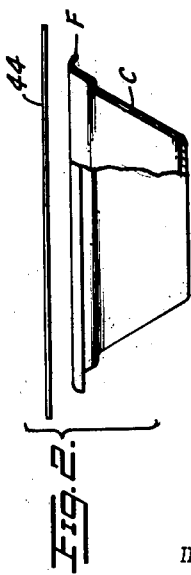

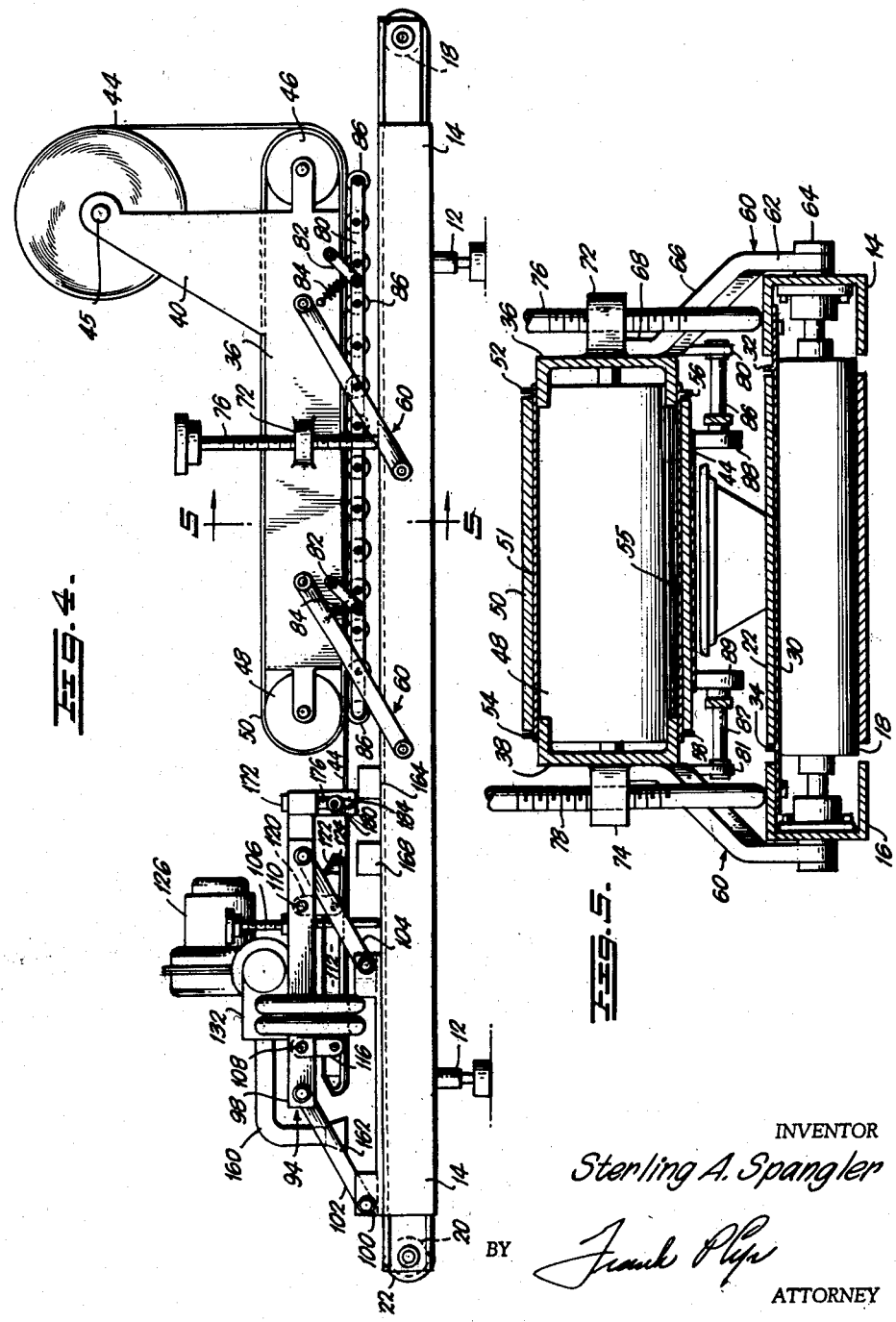

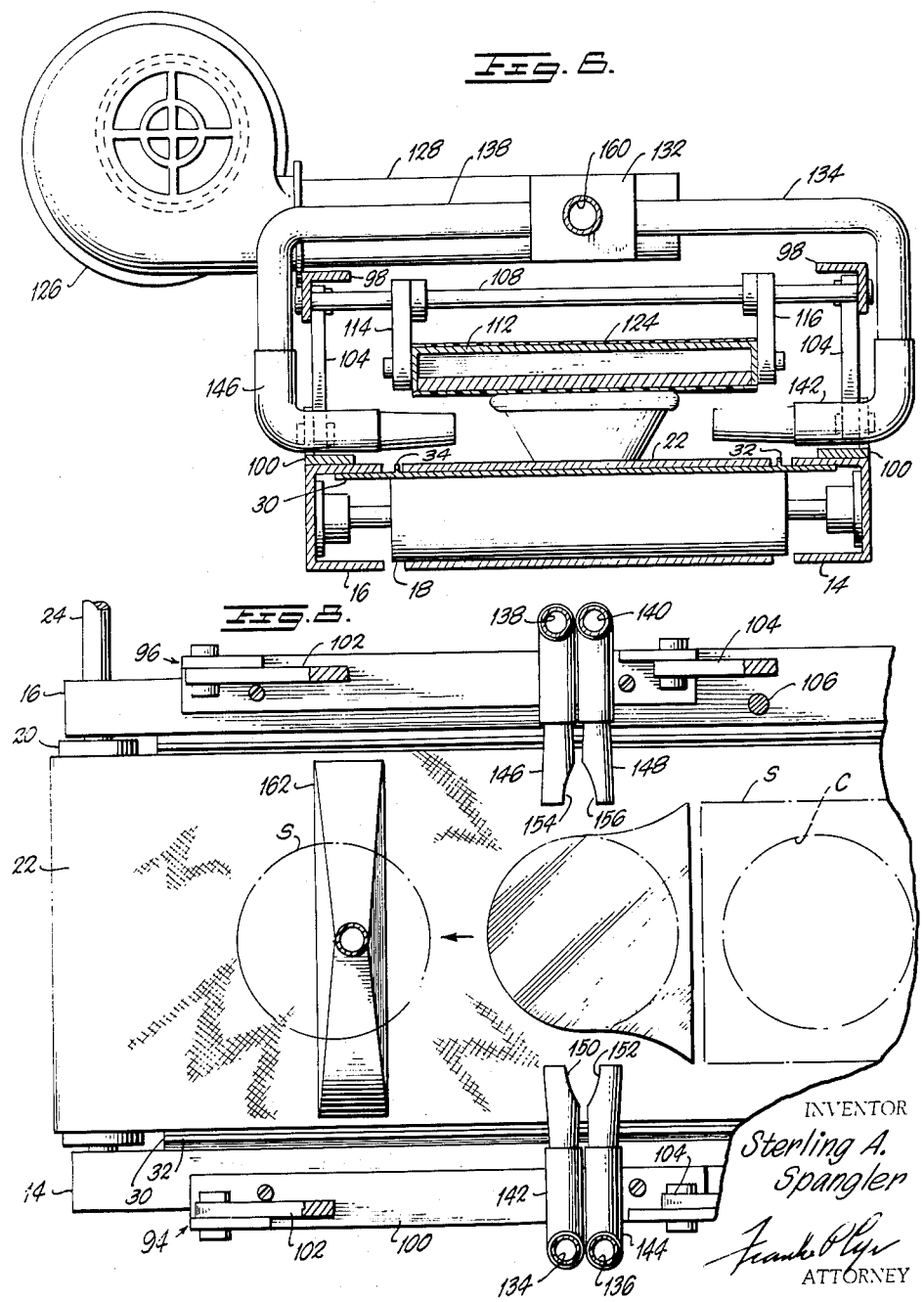

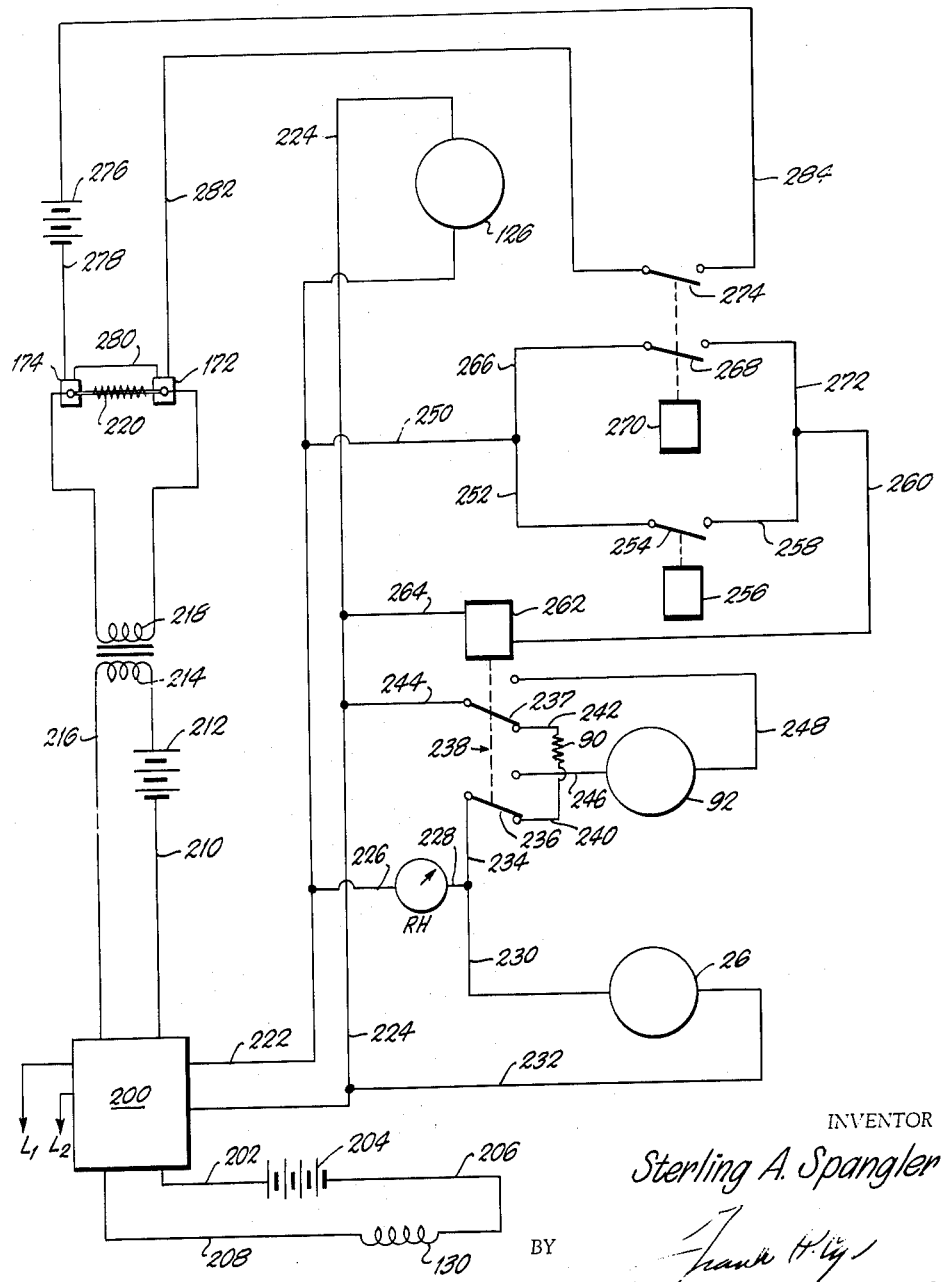

United States Patent Office 3,197,940
Patented Aug. 3, 1965

3,197,940
APPARATUS FOR APPLYING COVERS TO CONTAINERS
Sterling A. Spangler, York, Pa., assignor to Jedco Corporation, King of Prussia, Pa., a corporation of Pennsylvania
Filed Apr. 12, 1962, Ser. No. 186,977
3 Claims. (Cl. 53—329)

This invention relates to a method and apparatus for applying covers on containers and more particularly for covering the opening of a container with a closure formed of heat shrinkable plastic film.

The use of heat shrinkable plastic film of the transparent type has advanced the art of packaging and wrapping because of the shrinking characteristic of such plastic film. However, the plastic film is extremely thin which in the past has required complicated and costly handling devices; in addition, the heat applying devices for shrinking the plastic film were inefficient in that heat was applied to the container as well as to the plastic film.

It is, therefore, an object of this invention to provide an efficient method for applying a heat shrinkable cover to a container.

Another object of this invention is to automatically apply a heat shrinkable closure to a container.

This invention has another object in that a closure sheet of plastic film is automatically dispensed from a roll of plastic film.

It is another object of this invention to feed a strip of plastic film covering in spaced parallel relation to a conveyed container.

It is another object of this invention to superimpose a heat shrinkable film feeder device on a container conveyor.

Another object of this invention is to force a sheet of transparent film into covering engagement with a container during simultaneous movement of the sheet and the container.

Another object of this invention is to apply a heat shrinkable film to the opening of a container by blowing a heated medium to overhanging edges of the film.

Another object of this invention is to blow a heated medium across the edges and the top of a heat shrinkable closure for a container.

This invention has yet another object in that a plurality of nozzles for blowing a heated medium across a heat shrinkable closure apparatus are vertically and horizontally adjustable.

A further object of this invention is to operate intermittently the transparent film feeding device of a container closure apparatus in response to container movement on the apparatus.

This invention has a further object in that the transparent film of a container closure apparatus is automatically cut into a closure sheet in response to container movement on the apparatus.

This invention has still a further object in that the container conveyor of the container closure apparatus is continuously driven and the closure covering feed mechanism is intermittently driven.

The preferred embodiment of the present invention includes a container conveyor and heat shrinkable film feeder which are driven at the same speed as determined by a suitable rheostat control. As the container is moved past a predetermined position on the continuously driven conveyor, it is engaged by the heat shrinkable film and a sensing device starts the intermittently driven film feeder; then, in sequence, the film feeder is stopped and the film is cut by a heated wire. The continuously moving container and the cut sheet of film thereon is heated by blowers disposed on opposite sides of the conveyor causing the edges of the film sheet to wrap around the periphery of the container and another blower heats the top of the film sheet causing it to form a tight closure for the container.

Other objects and advantages of this invention will become apparent from the following description taken in connectiton with the accompanying drawings wherein:

FIG. 1 is a top plan view of an apparatus embodying this invention;

FIG. 2 is an exploded elevation view, with parts in section, of a container and its cover;

FIG. 3 is an elevation view, with parts in section, showing the cover as applied to the container;

FIG. 4 is a side elevation view of FIG. 1;

FIG. 5 is a sectional view taken along the line 5—5 of FIG. 4;

FIG. 6 is a sectional view taken along the line 6—6 of FIG. 1;

FIG. 7 is a partial longitudinal section taken along the line 7—7 of FIG. 1;

FIG. 8 is a section view taken along the staggered line 8—8 of FIG. 7;

FIG. 9 is a fragmentary view of FIG. 8 showing the blower nozzles in another position and another type of container; and FIG. 10 is a schematic diagram of an electrical control circuit for the apparatus of FIG. 1.

Referring now to FIGS. 1 and 4 of the drawings, the preferred embodiment of the invention includes an elongated substantially U-shaped conveyor base 10 suitably supported by a plurality of adjustable leveling feet 12. The conveyor base 10 is open at the top and the opposite side legs thereof have top flanges to define guide channels 14 and 16. An idler roller 18 is mounted at one end of the base 10 and is rotatably supported between the channels 14 and 16. A driving roller 20 is mounted at the opposite end of the base 10 and is rotatably supported between the channel guides 14 and 16. An endless belt 22, made of any suitable material such as canvas, is movably supported on the rollers 18 and 20. As is apparent from FIG. 4, the guide channels 14 and 16 are adjustably extensible from the base 10 to provide proper tensioning for the flexible conveyor belt 22 by any suitable means well known in the art. The drive roller 20 is rotated by means of a drive shaft 24 which is driven by suitable gearing (not shown) from a variable speed electric motor 26 that is mounted on a supporting bracket 28 extending from base 10 beyond the guide channel 16. The conveyor belt 22 conveys articles from right to left as viewed in FIGS. 1 and 4 and during such movement the flexible conveyor belt 22 is supported on its undersurface by a plate member 30 fixed to the underside of the upper flanges of the guide channels 14 and 16 and extending throughout the length of the base 10. The longitudinal movement of the conveyor belt 22 is maintained in straight path by edge guides 32 and 34 that extend upwardly from the plate member 30, with one on each side of the belt 22 to prevent lateral movement.

On the right end portion of base 10 as viewed in FIG. 4, a film feed assembly is superimposed in spaced parallel relation over the conveyor belt 22. The film feed assembly includes a pair of spaced parallel side channel members 36 and 38 having upwardly disposed mounting arms 40 and 42, respectively. A roll of heat shrinkable film 44, made of any suitable material such as a transparent heat shrinkable plastic, has a roller element 45 rotatably supported between the upper ends of the two mounting arms 40 and 42. An idler roller 46 is rotatably supported between the right end portions of channel members 36 and 38 as viewed in FIG. 4 and a driving roller 48 is rotatably mounted at the left end portions thereof. An endless 50, made of any suitable flexible material is movably supported on the rollers 46 and 48 for feeding the film 44 in strip form from its roller 45. The movement of the belt 50 is guided by an elongated upper plate 51 which is fixed to the top flanges of side channel members 36 and 38 and which includes upwardly extending spaced guides 52 and 54 disposed adjacent the belt edges. A similar plate 55 having downwardly extending spaced guides 56 and 58 is fixed to the bottom flanges of side channel members 36 and 38. The movement of the belt 50 is thus prevented from lateral movement on its upper and lower paths of travel.

The film feed assembly is supported on the base 10 by a plurality of pivoted brackets, indicated generally at 60, two being shown on each side of the film assembly. Inasmuch as all the brackets 60 are of the same construction, only one will be described in detail. As is illustrated in FIGS. 1 and 5, each bracket 60 includes a lower portion 62 pivotally attached to the outer wall of the base guide channel 14 as by a pivot pin 64, a central offsetting portion 66 and an upper portion 68 pivotally attached to the outer wall of channel member 36 as by pivot pin 70. The offsetting portion 66 permits the upper portion 68 to be disposed inwardly above the guide channel 14 for pivotal attachment to the channel member 36 so that the belt 50 is disposed in spaced relation above the conveyor belt 22. As is shown in FIG. 4, the brackets 60 are inclined at an acute angle relative to the base 10 so that the entire film feed assembly is gravitated toward the base 10. The outer walls of channel members 36 and 38 are formed with centrally disposed bosses 72 and 74, respectively, having internally threaded bores for receiving adjusting screws 76 and 78, respectively. The lower ends of the adjusting screws 76 and 78 abut the top flanges of the guide channels 14 and 16, respectively, and rotation of such screws in their respective bosses 72 and 74 causes the entire film feed assembly to be vertically adjusted relative to the base 10. During the adjusting operation the brackets 60 are pivoted about their corresponding pivot pin mountings 64 and 70.

The belt 50 constitutes a conveying or feeding belt for the heat shrinkable film which is wound off its rollers 45 in a clockwise direction and is engaged by the lower surface of the belt 50. Clockwise rotation of the driving roller 48 causes the lower surface of the belt 50 and the film strip 44 to move in the same direction as the conveyor belt 22, i.e., from right to left as viewed in FIG. 4. During this longitudinal movement, the film strip 44 is held in contact with the traveling belt 50 by means of a pair of chain rollers suspended from the channel members 36 and 38. The first chain roller includes an elongated strap member 80 suspended from the outside wall of channel member 36 by a plurality of hanger brackets 82 each of which has a lower end pivotally attached to the strap member 80 and an upper end pivotally attached to the channel member 36. As viewed in FIG. 4, each hanger bracket 82 is inclined at an acute angle relative to the strap 80 and is resiliently urged upwardly toward the belt 50 by a coil spring 84 which has an axis perpendicularly disposed to the hanger bracket 82 and which is mounted in tension between the channel member 36 and the lower end portion of hanger bracket 82. Equally spaced along the strap 80 are a plurality of stub axles 86 positioned underneath the channel member 36 and having one end attached to the strap 80 and an opposite end disposed under the adjacent side portion of belt 50. A small roller element 88 is rotatably carried on the inner end of each stub axle so as to be disposed for roller engagement with the film strip 44. The second chain roller assembly is suspended from the outside wall of the channel member 38 and has an identical arrangement as the first including a strap 81, hanger brackets and coil springs, stub axles 87 and roller elements 89. With such a construction the biased roller elements 88 and 89 maintain the film strip 44 in contact with the lower part of belt 50 whereby the film strip 44 and the belt 50 travel as a unit from right to left as view in FIG. 4.

The drive roller 48 of the film feed assembly is operated by an electric clutch and brake mechanism 90 and a variable speed electric motor 92 which are supported by any suitable mounting means attached to the guide channel 16. The film feed motor 92 is similar to the conveyor drive motor 26 and through suitable control elements to be described hereafter the two motors are operated at the same speed.

The heat supplying means for the apparatus is positioned downstream of the film feed assembly relative to the conveyor belt 22. The heat supplying means is suspended over the conveyor belt 22 in a manner similar to the film feed assembly by means of a pair of parallel linkages, indicated generally at 94 and 96, mounted on the guide channels 14 and 16, respectively. Inasmuch as the two linkages are identical in structure, only one will be described in detail. As is illustrated in FIG. 4, each parallel linkage includes upper and lower angle bars 98 and 100 arranged in horizontal parallel relation and being pivotally joined adjacent their ends by parallel inclined links 102 and 104. The lower bar 100 is securely fixed to the top flange of guide channel 14 with the links 102 and 104 inclined at an acute angle thereto. Thus, the entire assembly of the heat supplying means is gravitated toward the conveyor belt 22. Vertical adjustment is accomplished by adjusting screw means 106 extending through a threaded bore in the upper bar 98 and contacting the top flange of guide channel 14.

The upper angle bars 98 of the linkages 94 and 96 are joined for unitary adjusting movement by a pair of spaced rods 108 and 110.

A pair of spaced rods 108 and 110 are fixed to the upper angle bars 98 so that the parallel linkages 94 and 96 are adjusted with a unitary movement. A substantially rectangular pressure plate 112 is suspended from the rods 108 and 110 so as to be in the path of a container traveling along the conveyor belt 22. As is shown in FIG. 6, a pair of hanger links 114 and 116 have their upper ends pivotally attached to the rod 108 and their lower ends pivotally attached to the respective opposite sides of pressure plate 112; similarly, a second pair of hanger links 118 and 120 extend between the rod 110 and the corresponding opposite sides of the pressure plate 112.

Each end of the pressure plate 112 is upwardly curved at 122 and a flexible wrapping 124 is looped around the pressure plate to cover its top and bottom and its ends 124, leaving only the sides uncovered. The wrapping cover may be made of any suitable material having surface bearing qualities substantially unaffected by heat, such as polytetrafluoroethylene which is available under the trademark Teflon.

An air blower 126 is mounted on the parallel linkage 96 by being securely fastened to its upper angle bar 98 and has a heating tube 128 extending towards the opposite parallel linkage 94. An electric heating coil 130 is disposed in the tube 128 to heat the air delivered thereto by the blower 126. Centrally disposed above the longitudinal axis of the conveyor belt 22, a hollow box defining a hot air distribution chamber 132 extends perpendicularly from the heating tube 128. A pair of L-shaped outlet tubes 134 and 136 are secured to one side of the distribution chamber box 132 and a pair of similar L-shaped outlet tubes 138 and 140 are secured to the opposite side. As is shown in FIGS. 6 and 7, the tubes 134, 136, 138 and 140 each have long sections extending beyond the upper angle bars 98 and downwardly extending short sections to which L-shaped nozzle outlets 142, 144, 146 and 148, respectively, are rotatably secured as by beaded flanges (not shown). The L-shaped nozzle outlets 142, 144, 146 and 148 have open ends which are disposed under the pressure plate 112 and which are arcuately formed into diverter tips 150, 152, 154 and 156, respectively. As described above, the nozzle outlets are adjusted vertically as a unit with the entire heat applying assembly by means of the screws 106 and the horizontal adjustment thereof is accomplished by separate rotation of each nozzle outlet at the rotary connection of its corresponding outlet tube. This horizontal adjustability is best illustrated in FIG. 9.

The left end of distribution chamber 132 is provided with another L-shaped conduit 160 extending parallel to and then downwardly toward the conveyor belt 22 with its free end being flared to define a rectangular diffusion outlet 162. The diffusion outlet 162 is disposed downstream of the pressure plate 112 and has a major axis dimension almost as wide as the conveyor belt 22 so as to direct a stream of hot air perpendicularly toward the conveyor belt 22.

The various control elements and the wiring diagram of FIG. 10 will be described in their proper order in connection with the following description of the sequence of operation of the method and apparatus of covering a container. The container may be any size and any shape within the dimensional limits of the apparatus; for example, FIG. 2 illustrates a generally round cup-shaped container C having a radially outwardly extending flange F and a portion of the film strip 44 superimposed in spaced relation thereto which represents their initial traveling positions.

The operation of the apparatus is commenced by manually setting a rheostat RH to a desired speed for motors 26 and 92 and by manually turning on a main control switch 200 which may be of any suitable type. With the control switch 200 closed, three electric circuits are completed: first, from line L1 through the switch 200, conductor 202, battery 204, conductor 206, blower heating coil 130, conductor 208 and switch 200 to line L2; second, a parallel circuit from switch 200 through conductor 210, battery 212, the transformer primary 214 and conductor 216 to the switch 200; the transformer secondary 218 completes a circuit for energizing an electrically heated cutting wire 220; and, third, a parallel circuit from the switch 200 through conductor 222, the blower motor 126 and conductor 224 to the switch 200. Simultaneously with the energization of the heating devices, the conveyor drive motor 26 is energized by a parallel circuit from the conductor 222 through conductor 226, the rheostat RH, conductor 228, conductor 230, drive motor 26 and conductor 232 to the conductor 224.

At this time, the conveyor belt 22 is moving at a constant speed; however, the film strip 44 is not being fed because the feed drive motor 92 is not energized. The motor 92 is shunted by a parallel circuit from the rheostat RH and the conductor 228 through conductor 234, the lower blade 236 of a double throw double pole switch 238, conductor 240, the electric clutch and brake 90, conductor 242, the upper blade 237 of the switch 238 and conductor 244 to the conductor 224. Thus, the brake 90 is energized until the switch 238 is actuated which releases the brake and energizes the drive motor 92 by a parallel circuit from switch blade 236 through conductor 246, drive motor 92 and conductor 248 to the switch blade 237.

The actuation of the feed drive motor is dependent upon the presence of a container C being moved along the conveyor belt 22, which is sensed by suitable photocell means. As soon as the container C interrupts the light beam between a first pair of photocells 164 and 166 (FIG. 1), the feed drive motor is energized by a relay circuit which actuates the switch 238. This relay circuit comprises a parallel circuit from the conductor 222 through conductor 250, conductor 252, switch blade 254 which is closed by the first photocell controlled relay 256, conductor 258, conductor 260, the switch actuating relay 262 and conductor 264 to the conductor 224. Energization of the relay 262 actuates the switch 238 whereby the switch blades 236 and 237 open the brake circuit and close the feed drive motor circuit; the resistance of the brake 90 is designed to equal the resistance of the feed drive motor 92 so that there is no variation in current to the conveyor drive motor 26 which will continue running at its set speed.

Inasmuch as photocell structure and operation are well known in the art, a detailed description thereof and of an accompanying circuit for energizing the photocell controlled relays have been eliminated for the sake of brevity. It is deemed sufficient to merely state that such relays are normally deenergized and their accompanying switches are normally open as long as the photocell beam is continuous. In the actual construction of the described apparatus, the photocell circuits were subject to a control switch in the main control switch 200.

Continued movement of the container C along the conveyor belt 22, causes interruption of the light beam between a second pair of photocells 168 and 170 (FIG. 1) which maintains the switching relay 262 energized by means of a circuit shunting the switch blade 254, that may be traced from the conductor 250 through conductor 266, switch blade 268 which is closed by the second photocell controlled relay 270, and conductor 272 leading to the conductor 260. Thus, when the container C passes the photocells 164 and 166, the relay 256 opens the switch blade 254 but the brake 90 and feed drive motor 92 remain energized because the switch relay 262 remains energized by the closure of the switch blade 268. It is apparent that the spacing between the first pair of photocells 164 and 166 and the second pair of photocells 168 and 170 along the top of guide channels 14 and 16, respectively, may be varied in accordance with the dimension of the container to be covered. In the arrangement disclosed, the container C will interrupt the beam of the second pair of photocells 168 and 170 before restoring the beam of the first pair of photocells 164 and 166 so that the feed drive motor 92 remains energized during this time.

The second photocell controlled relay 270 closes a second switch blade 274 when the beam between photocells 168 and 170 is interrupted which causes energization of wire cutter solenoids 172 and 174 (FIG. 1). This energizing circuit may be traced from a battery 276 through conductor 278, the coil of solenoid 174, conductor 280, the coil of solenoid 172, conductor 282, the closed switch blade 274 and conductor 284 leading back to the battery 276. Upon energization of the series connected coils of solenoids 172 and 174, their respective armatures 176 and 178 are raised vertically away from the connectors 180 and 182, respectively, which carry the heated cutting wire 220. The armatures 176 and 178 are each spring biased to their normal unenergized positions as shown in FIG. 4, so that energization thereof compresses their springs into stored energy positions. The connectors 180 and 182 are vertically slidable in slotted mounting blocks 184 and 186, respectively, and are normally spring biased upwardly to the upper ends of such slots by any suitable means such as leaf springs (not shown). It is now apparent that energization of the solenoids 172 and 174 moves their armatures 176 and 178 to stored energy positions from which they must be released to cause the film cutting operation.

The continued movement of the container C with the film strip 44 on top of the flange F causes the pressure plate 112 to swing upwardly to the left as viewed in FIG. 4 until the film strip 44 is forced against the flange F as it moves past the rounded end 122 and slides relative to the Teflon covering 124. As soon as the rear portion of container C clears the second photocells 168 and 170, the beam is restored and the photocell controlled relay 270 opens the switch blades 268 and 274. The switch blade 268 thus opens the circuit for the switching relay 262 causing actuation of the switch blades 236 and 237 to their positions shown in FIG. 10 where the feed drive motor 92 is deenergized and the brake 90 is applied to immediately stop the feeding of film strip 44. At the same time the switch blade 274 opens the circuit for the solenoids 172 and 174 whose released armatures 176 and 178 slam against the connectors 180 and 182 whereupon the heated wire 220 is moved downwardly to sever the film strip 44. Upon cutting of the film strip 44, the severed film sheet S continues moving with the container C. At this time the photocell beams are ready to commence the film feeding again as soon as another container reaches first photocell beam. With such an arrangement, there is no need for equally spacing the container on the entrance of the conveyor belt 22.

As the film sheet S and container C slide under the Teflon covering 124 of the pressure plate 112, the nozzle tips 150 and 152 direct hot air against the forward overhanging edges of the film sheet S and the nozzle tips 152 and 156 direct hot air against the rearward overhanging edges of the film sheet S. By the time the container C clears the nozzles 150, 152, 154 and 156, the overhanging edges of the film sheet S are heat shrunk to overlap each other under the peripheral flange F. The container C then passes under the diffusion outlet 162 which blows hot air across the entire top surface of the film sheet S causing it to heat shrink in tight fitting, covering engagement with the top of the peripheral flange F, which results in a covered container as shown in FIG. 3.

As is apparent from FIG. 9, the container C may have a variety of shapes, such as rectangular, and the horizontal adjustability of the nozzles permits the diverter tips 150, 152, 154 and 156 to direct streams of hot air around sharp corners.

Inasmuch as the present invention is subject to many modifications and changes in structural detail, it is intended that all matter contained in the foregoing description and the preferred embodiment shown on the drawings shall be interpreted as illustrative and not in a limiting sense.

What is claimed is:

1. An apparatus for applying heat shrinkable film covers to peripheral flanges of containers comprising a conveyer frame, a moving conveyor on said frame for moving a container along a longitudinal path, a film feed mechanism mounted on said frame and being superimposed over said conveyor for feeding a strip of heat shrinkable film along a longitudinal path in spaced parallel relation to the peripheral flange of the moving container, adjustment means moving said feed mechanism relative to said moving conveyor to adjust a clearance between the strip and the peripheral flange, pressure means for forcing the strip into engagement with the peripheral flange of the moving container, cutting means for severing the strip engaging the peripheral flange into a single covering sheet, means disposed on opposite sides of said conveyor frame for transversely applying heat across the covering sheet whereby edge portions of the covering sheet are heat shrunk under the peripheral flange, means disposed above said conveyor frame for perpendicularly applying heat to the covering sheet whereby portions of the covering sheet intermediate its edge portions are heat shrunk into covering contact with the peripheral flange of the container.

2. The apparatus as recited in claim 1 wherein said cutting means comprises a heated wire movable into cutting position in response to container movement.

3. The apparatus as recited in claim 1 wherein said cutting means comprises a heated wire disposed above said conveyor frame between said film feed mechanism and said pressure means and solenoid means operable in response to container movement for moving said heated wire across said strip of heat shrinkable film.

References Cited by the Examiner

UNITED STATES PATENTS

| 2,785,519 | 3/57 | Rumsey | 53—184 |
| 2,789,407 | 4/57 | Smallegan | 53—184 |
| 2,880,522 | 4/59 | Rollins | 53—184 X |
| 2,976,655 | 3/61 | Dreyfus et al. | 53—30 X |
| 3,010,262 | 11/61 | Rumsey | 53—30 |
| 3,014,320 | 12/61 | Harrison | 53—184 X |
| 3,046,711 | 7/62 | Harrison | 53—30 |
| 3,099,118 | 7/63 | Stelling. | |
| 3,115,735 | 12/63 | Harrison | 53—184 |

FOREIGN PATENTS 95,116  11/59  Norway.

FRANK E. BAILEY, *Primary Examiner.*

ROBERT A. LEIGHEY, BROMLEY SEELEY, TRAVIS S. McGEHEE, *Examiners.*